United States Patent
Yoshida et al.

(10) Patent No.: US 11,417,465 B2
(45) Date of Patent: Aug. 16, 2022

(54) ELECTRONIC COMPONENT HAVING A PLURALITY OF INTERNAL ELECTRODES

(71) Applicant: TDK CORPORATION, Tokyo (JP)

(72) Inventors: Daisuke Yoshida, Tokyo (JP); Yuki Takahashi, Tokyo (JP); Hikaru Hirabayashi, Tokyo (JP); Takuto Okamoto, Tokyo (JP); Masato Kimura, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/161,217

(22) Filed: Jan. 28, 2021

(65) Prior Publication Data

US 2021/0257161 A1   Aug. 19, 2021

(30) Foreign Application Priority Data

Feb. 13, 2020 (JP) .............................. JP2020-022428

(51) Int. Cl.
*H01G 4/012* (2006.01)
*H01G 4/008* (2006.01)
*H01G 4/12* (2006.01)
*H01G 4/232* (2006.01)
*H01G 4/30* (2006.01)

(52) U.S. Cl.
CPC ............ *H01G 4/012* (2013.01); *H01G 4/008* (2013.01); *H01G 4/1218* (2013.01); *H01G 4/232* (2013.01); *H01G 4/30* (2013.01)

(58) Field of Classification Search
CPC .......... H01G 4/012; H01G 4/008; H01G 4/30; H01G 4/224
See application file for complete search history.

(56) References Cited

U.S. PATENT DOCUMENTS

| | | | |
|---|---|---|---|
| 2012/0194031 A1* | 8/2012 | Ogawa | H01G 4/005 336/200 |
| 2015/0021073 A1* | 1/2015 | Kim | H01G 2/065 174/258 |
| 2017/0011852 A1* | 1/2017 | Miyazaki | H01G 4/2325 |
| 2019/0164693 A1* | 5/2019 | Ono | H01G 4/30 |
| 2019/0355518 A1* | 11/2019 | Harada | H01G 4/30 |
| 2020/0152391 A1* | 5/2020 | Kang | H01G 4/30 |
| 2021/0104364 A1* | 4/2021 | Okuda | H01G 4/012 |

FOREIGN PATENT DOCUMENTS

| | | | |
|---|---|---|---|
| JP | H11191515 A | * | 7/1999 |
| JP | 2000-114097 A | | 4/2000 |
| JP | 2008-091400 A | | 4/2008 |
| JP | 2011233696 A | * | 11/2011 |
| JP | 2016025287 A | * | 2/2016 |

* cited by examiner

*Primary Examiner* — David M Sinclair
*Assistant Examiner* — Daniel M Dubuisson
(74) *Attorney, Agent, or Firm* — Oliff PLC (57) ABSTRACT

A multilayer capacitor includes an element body, an external electrode, and a plurality of internal electrodes, and a relationship of R1<T is satisfied in a first cross section extending in a direction in which the pair of end surfaces face each other, extending in a lamination direction of the plurality of internal electrodes, and including an electrode portions and a connecting portions when a radius of curvature of an edge line surface is R1 and a thickness between the side surface and the internal electrode at a position at which the side surface and the internal electrode are closest to each other in the lamination direction is T.

15 Claims, 9 Drawing Sheets

ELECTRONIC COMPONENT HAVING A PLURALITY OF INTERNAL ELECTRODES

TECHNICAL FIELD

The present invention relates to an electronic component.

BACKGROUND

An electronic component including an element body including a side surface and an end surface adjacent to each other, an external electrode disposed on the side surface and the end surface, and an internal electrode disposed in the element body is known (for example, see Japanese Unexamined Patent Publication No. 2000-11409). The element body has a rectangular parallelepiped shape in which a corner portion and an edge line portion are rounded.

SUMMARY

There is a likelihood that chipping (chipping) will occur in an element body, for example, during the manufacturing process. When element bodies collide with each other or when an element body collides with manufacturing equipment other than an element body, an impact is applied to the element body. Since a corner portion of the element body has a relatively low strength, there is a high likelihood that chipping will occur on the corner portion when an impact is applied. Therefore, occurrence of chipping in the element body is suppressed by forming a corner portion and an edge line portion of the element body into a curved surface shape.

An external electrode generally includes an electrode layer disposed on a side surface and an end surface, and a plated layer disposed to cover the electrode layer. The plated layer is formed on the electrode layer using a plating method. When the element body is immersed in a plating solution, the plating solution may enter an interface between the external electrode and the element body through the external electrode due to a pressure difference between the outside and inside of the external electrode (electrode layer). An end portion of an internal electrode is exposed to a surface of the element body to be connected to the external electrode. Therefore, the plating solution that has entered the interface between the external electrode and the element body may enter the inside of the element body through an interface between the end portion or an internal conductor of the internal electrode and the element body. Particularly, when the corner portion and the edge line portion of the element body have a curved surface shape, thicknesses of the external electrode at the corner portion and the edge line portion decrease, and this causes the plating solution to easily enter. Entering of the plating solution into the element body causes decrease in reliability of the electronic component.

An objective of one aspect of the present invention is to provide an electronic component in which improvement in reliability can be achieved.

An electronic component according to one aspect of the present invention includes an element body having a pair of end surfaces facing each other and four side surfaces connecting the pair of end surfaces, an external electrode disposed on the side surfaces and each of the end surfaces, and a plurality of internal electrodes disposed in the element body, in which the element body has an edge line surface which is provided between the end surface and each of the side surfaces and which is curved, the external electrode has an electrode layer provided across the end surface and a part of the side surface and a plated layer covering the electrode layer, the plurality of internal electrodes each have an electrode portion disposed to face other internal electrodes and a connecting portion connecting the electrode portion and the external electrode, and a relationship of $$R1<T$$

is satisfied in a first cross section extending in a direction in which the pair of end surfaces face each other, extending in the lamination direction of the plurality of internal electrodes, and having the electrode portion and the connecting portion when a radius of curvature of the edge line surface is R1 and a thickness between the side surface and the internal electrode at a position at which the side surface and the internal electrode are closest to each other in a lamination direction is T.

In the electronic component according to one aspect of the present invention, the radius of curvature R1 of the edge line surface of the element body in the first cross section is smaller than the thickness T between the side surface and the internal electrode. That is, in the electronic component, an outer layer thickness of the element body is larger than a curvature of the edge line surface of the element body in the first cross section. Thereby, in the electronic component, entering of a plating solution into the element body via the connecting portion of the internal electrode can be suppressed in a plating process of forming the plated layer of the external electrode. As a result, improvement in reliability can be achieved in the electronic component.

In one embodiment, a relationship of $$R2>T$$

may be satisfied in a second cross section extending in the direction in which the pair of end surfaces face each other, extending in the lamination direction of the plurality of internal electrodes, and including the electrode portion when a radius of curvature of the edge line surface is R2. In this configuration, the radius of curvature of the edge line surface can be increased towards a corner portion of the element body. Therefore, in the electronic component, the corner portion can have an increasingly curved shape toward the corner portion of the element body. Accordingly, occurrence of chipping in the element body can be further suppressed in the electronic component.

In one embodiment, the side surface parallel to the lamination direction may have a rectangular shape in which a corner portion is curved, and a relationship of $$R1<R3$$

may be satisfied when a radius of curvature of the corner portion of the side surface is R3. In this configuration, the radius of curvature of the edge line surface increases towards the corner portion of the element body. That is, the corner portion of the element body can be made to have a curved shape in the electronic component. Therefore, occurrence of chipping in the element body can be further suppressed in the electronic component.

In one embodiment, a width of the connecting portion may be smaller than a width of the electrode portion. In this configuration, a configuration in which the connecting portion is positioned at the corner portion and the edge line surface of the element body can be avoided by making the width of the connecting portion small. Thereby, in the electronic component, entering of the plating solution into the element body via the connecting portion of the internal electrode can be suppressed in the plating process of forming the plated layer of the external electrode. Therefore, improvement in reliability can be achieved in the electronic component. On the other hand, in the electronic component, an area of the electrode portion can be increased by making the width of the electrode portion large. Therefore, increase in capacitance can be achieved in the electronic component.

In one embodiment, the first cross section may include an end portion of the connecting portion exposed to the end surface. In this configuration, the relationship of R1<T is satisfied in the entire region of the connecting portion exposed to the end surface, Therefore, in the electronic component, entering of the plating solution into the element body via the connecting portion of the internal electrode can be further suppressed in the plating process of forming the plated layer of the external electrode.

In one embodiment, the electrode portion in the second cross section may have a portion positioned in a region corresponding to the edge line surface when viewed from a direction perpendicular to the side surface which is parallel to the lamination direction. In this configuration, the electrode portion in the second cross section has a portion protruding from the side surface in the direction in which the pair of end surfaces face each other. Thereby, an area of the electrode portion can be increased in the electronic component. Accordingly, increase in capacitance can be achieved in the electronic component.

In one embodiment, end portions in a direction in which the pair of end surfaces face each other in the electrode portions in the second cross section of two internal electrodes which are disposed at end portions in the lamination direction of the plurality of internal electrodes may have portions positioned in the region corresponding to the edge line surface when viewed from the direction perpendicular to the side surface which is parallel to the lamination direction. In this configuration, an area of the electrode portion can be increased. Accordingly, increase in capacitance can be achieved in the electronic component.

In one embodiment, the electrode portion in the first cross section may have a portion positioned in a region corresponding to the edge line surface when viewed from a direction perpendicular to the side surface which is parallel to the lamination direction. In this configuration, the electrode portion in the first cross section has a portion protruding from the side surface in the direction in which the pair of end surfaces face each other. Thereby, an area of the electrode portion can be increased in the electronic component. Accordingly, increase in capacitance can be achieved in the electronic component.

In one embodiment, end portions in a direction in which the pair of end surfaces face each other in the electrode portions in the first cross section of two internal electrodes which are disposed at end portions in the lamination direction of the plurality of internal electrodes have portions positioned in the region corresponding to the edge line surface when viewed from the direction perpendicular to the side surface which is parallel to the lamination direction. In this configuration, an area of the electrode portion can be increased. Accordingly, increase in capacitance can be achieved in the electronic component.

According to one aspect of the present invention, improvement in reliability can be achieved.

DETAILED DESCRIPTION

Hereinafter, a preferred embodiment of the present invention will be described in detail with reference to the accompanying drawings. In the description of the drawings, the same elements or elements having the same functions will be denoted by the same reference signs and duplicate descriptions thereof will be omitted.

Figure 1:
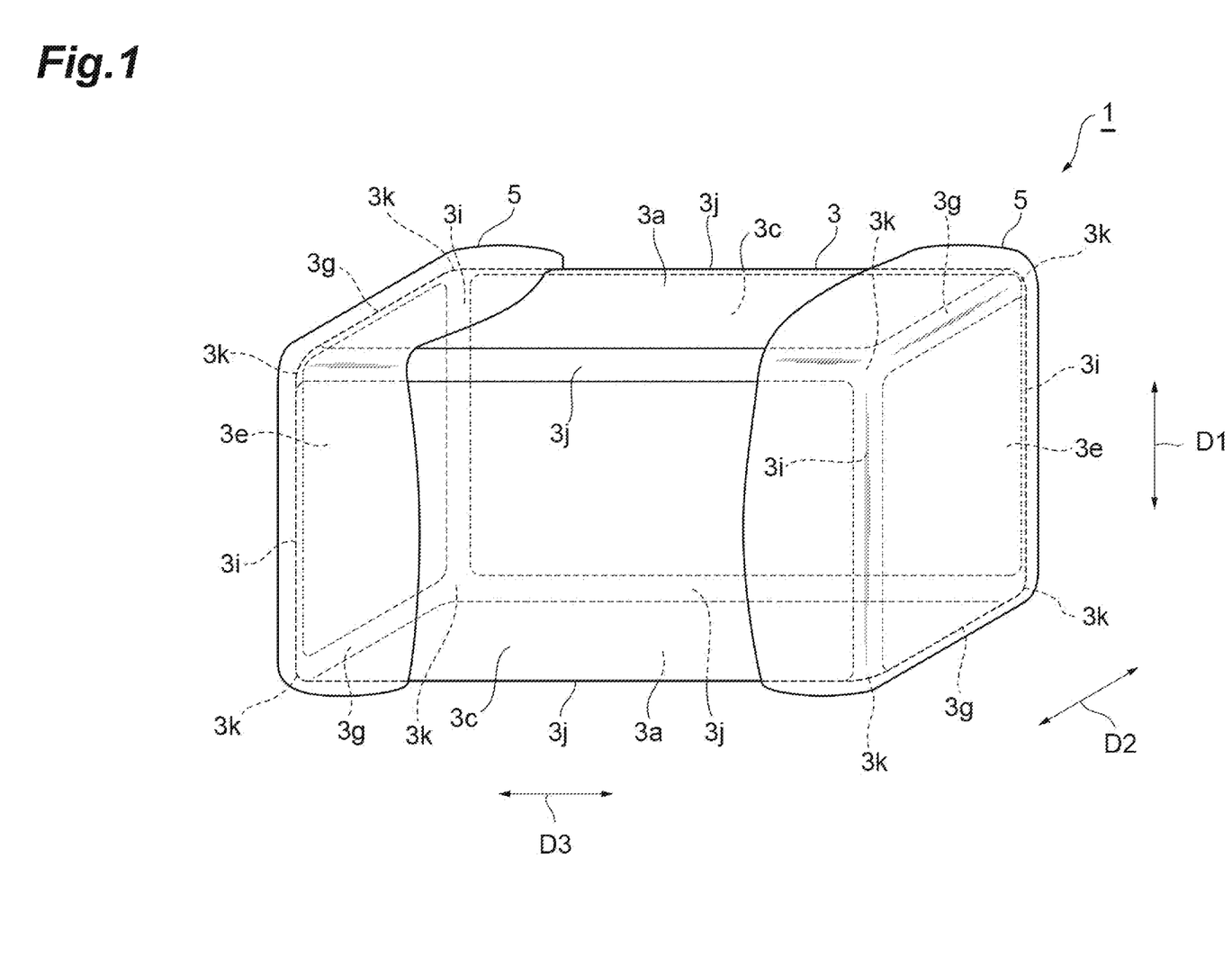
FIG. 1 is a perspective view of a multilayer capacitor according to the present embodiment.

As illustrated in FIG. 1, a multilayer capacitor (electronic component) 1 includes an element body 3 having a rectangular parallelepiped shape and a plurality of external electrodes 5. In the present embodiment, the multilayer capacitor 1 includes a pair of external electrodes 5. The pair of external electrodes 5 are disposed on an outer surface of the element body 3. The pair of external electrodes 5 are spaced apart from each other. The rectangular parallelepiped shape includes a rectangular parallelepiped shape in which corner portions and edge line portions are chamfered, and a rectangular parallelepiped shape in which corner portions and edge line portions are rounded.

The element body 3 includes a pair of main surfaces 3a facing each other, a pair of side surfaces 3c facing each other, and a pair of end surfaces 3e facing each other. The pair of main surfaces 3a, the pair of side surfaces 3c, and the pair of end surfaces 3e have a rectangular shape. The rectangular shape may include, for example, a shape in which each corner is curved, that is, a shape in which each corner is chamfered, and a shape in which each corner is rounded.

A direction in which the pair of main surfaces 3a face each other is a first direction D1. A direction in which the pair of side surfaces 3c face each other is a second direction D2. A direction in which the pair of end surfaces 3e face each other is a third direction D3. The multilayer capacitor 1 is solder-mounted on an electronic device. The electronic device may include, for example, circuit boards or electronic components. In the multilayer capacitor 1, one main surface 3a faces the electronic device. One main surface 3a is disposed to form a mounting surface. One main surface 3a is a mounting surface. Each of the main surfaces 3a is also a side surface of the element body 3 having a rectangular parallelepiped shape.

The first direction D1 is a direction perpendicular to the main surfaces 3a and is perpendicular to the second direction 12. The third direction D3 is a direction parallel to the main surfaces 3a and the side surfaces 3c and is perpendicular to the first direction DI and the second direction D2. The second direction D2 is a direction perpendicular to the side surfaces 3c and the third direction D3 is a direction perpendicular to the end surfaces 3e, In the present embodiment, a length of the element body 3 in the first direction D1 is larger than a length of the element body 3 in the second direction D2. A length of the element body 3 in the third direction D3 is larger than the length of the element body 3 in the first direction D1 and larger than the length of the element body 3 in the second direction D2. The third direction D3 is a longitudinal direction of the element body 3.

The length of the element body 3 in the first direction D1 is a height of the element body 3. The length of the element body 3 in the second direction D2 is a width of the element body 3. The length of the element body 3 in the third direction D3 is a length of the element body 3. In the present embodiment, for example, the height of the element body 3 may be 1880 µm, the width of the element body 3 may be 1840 µm, and the length of the element body 3 may be 3330 µm. The multilayer capacitor 1 is a so-called C3216 type product.

The pair of side surfaces 3c extend in the first direction D1 to connect the pair of main surfaces 3a. The pair of side surfaces 3c also extend in the third direction D3. The pair of end surfaces 3e extend in the first direction D1 to connect the pair of main surfaces 3a. The pair of end surfaces 3e also extend in the second direction D2.

The element body 3 includes four edge line surfaces 3g, four edge line surfaces 3i, and four edge line surfaces 3j. The edge line surfaces 3g are each positioned between the end surface 3e and the main surface 3a. The edge line surfaces 3i are each positioned between the end surface 3e and the side surface 3c. The edge line surfaces 3j are each positioned between the main surface 3a and the side surface 3c.

In the present embodiment, the edge line surfaces 3g, 3i, and 3j are each rounded to be curved in a convex shape. The edge line surfaces 3g, 3i, and 3j are each a curved surface having a predetermined radius of curvature. The element body 3 has been subjected to so-called R chamfering. The end surface 3e and the main surface 3a are indirectly adjacent to each other via the edge line surface 3g. The end surface 3e and the side surface 3c are indirectly adjacent to each other via the edge line surface 3i. The main surface 3a and the side surface 3c are indirectly adjacent to each other via the edge line surface 3j.

The element body 3 includes corner portions 3k. The corner portions 3k are each rounded to be curved. That is, each corner portion 3k has a curved surface shape. The corner portion 3k is an intersecting portion of the edge line surface 3g and the edge line surface 3i. That is, the edge line surface 3g and the edge line surface 31 form the corner portion 3k. A radius of curvature of the corner portion 3k is 140 µm to 160 µm. When the multilayer capacitor 1 is a C1005 type product, a radius of curvature R1 of the corner portion 3k is 20 µm to 45 µm. When the multilayer capacitor 1 is a C1608 type product, the radius of curvature R1 of the corner portion 3k is 60 µm to 80 µm. When the multilayer capacitor 1 is a C2012 type product, the radius of curvature R1 of the corner portion 3k is 100 µm to 120 µm. When the multilayer capacitor 1 is a C3225 type product, the radius of curvature R1 of the corner portion 3k is 200 µm to 250 µm.

Figure 4:
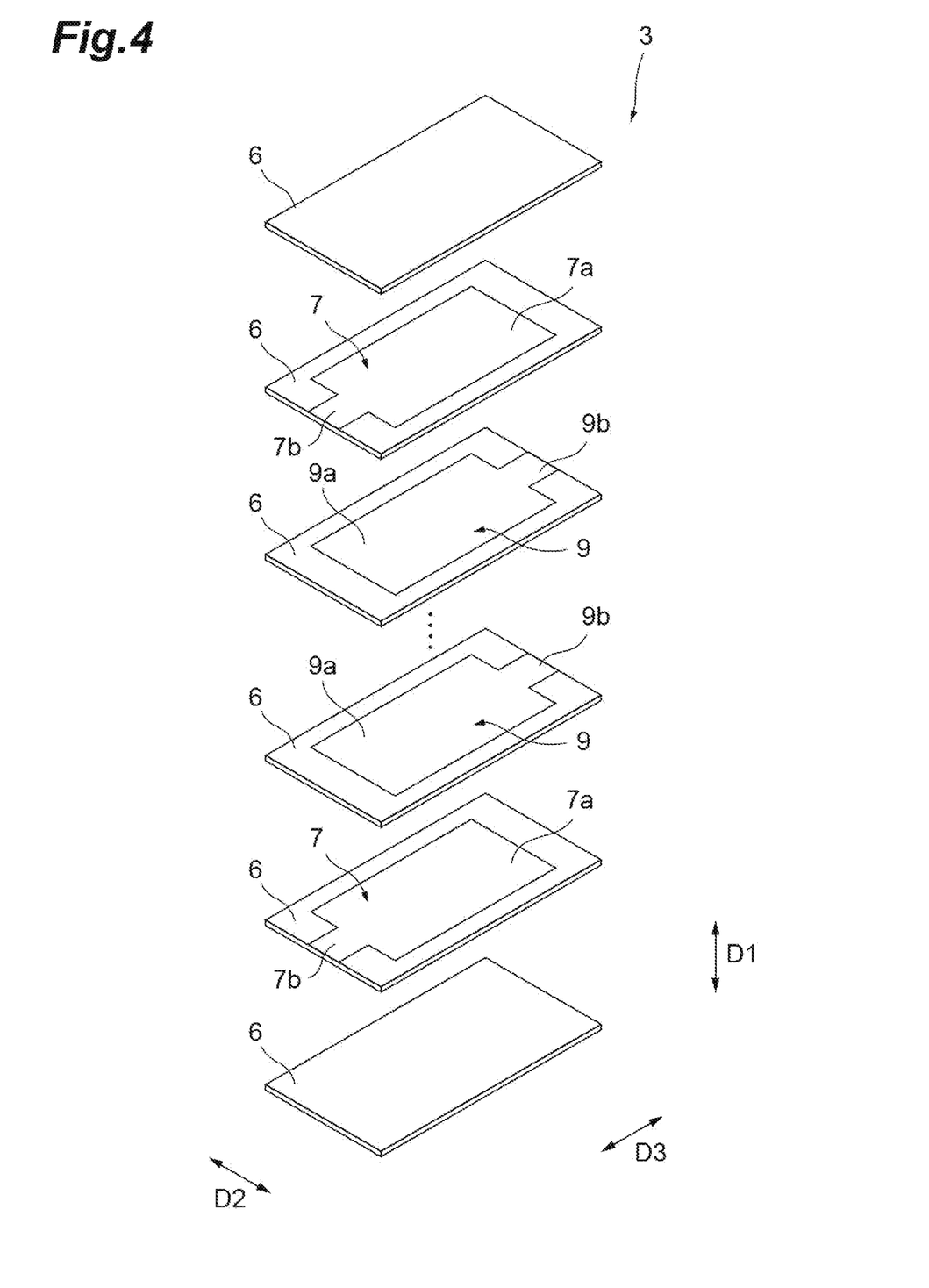
FIG. 4 is an exploded perspective view of an element body of the multilayer capacitor.

As illustrated in FIG. 4, the element body 3 is configured to have a plurality of dielectric layers 6 laminated in the first direction D1. The element body 3 includes the plurality of laminated dielectric layers 6. In the element body 3, a lamination direction of the plurality of dielectric layers 6 coincides with the first direction D1. Each of the dielectric layers 6 may be formed of, for example, a sintered body of a ceramic green sheet containing a dielectric material. The dielectric material may include, for example, a BaTiO3-based dielectric ceramic, a Ba(Ti, Zr)O3-based dielectric ceramic, a (Ba, Ca)TiO3-based dielectric ceramic, or the like. In an actual element body 3, the dielectric layers 6 are integrated to such an extent that boundaries between the respective dielectric layers 6 cannot be visually recognized.

Figure 2:
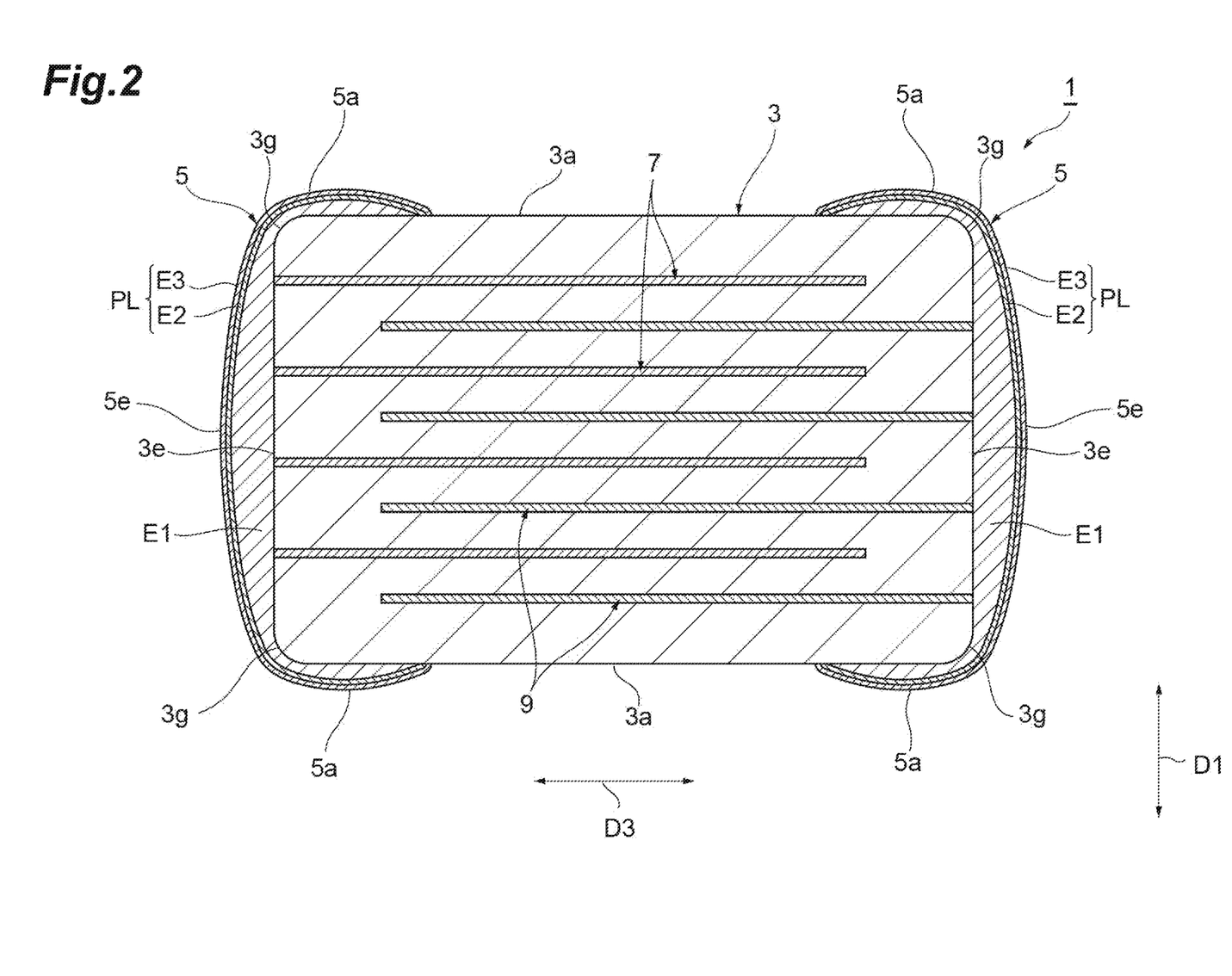
FIG. 2 is a view illustrating a cross-sectional configuration of the multilayer capacitor according to the present embodiment.
Figure 3:
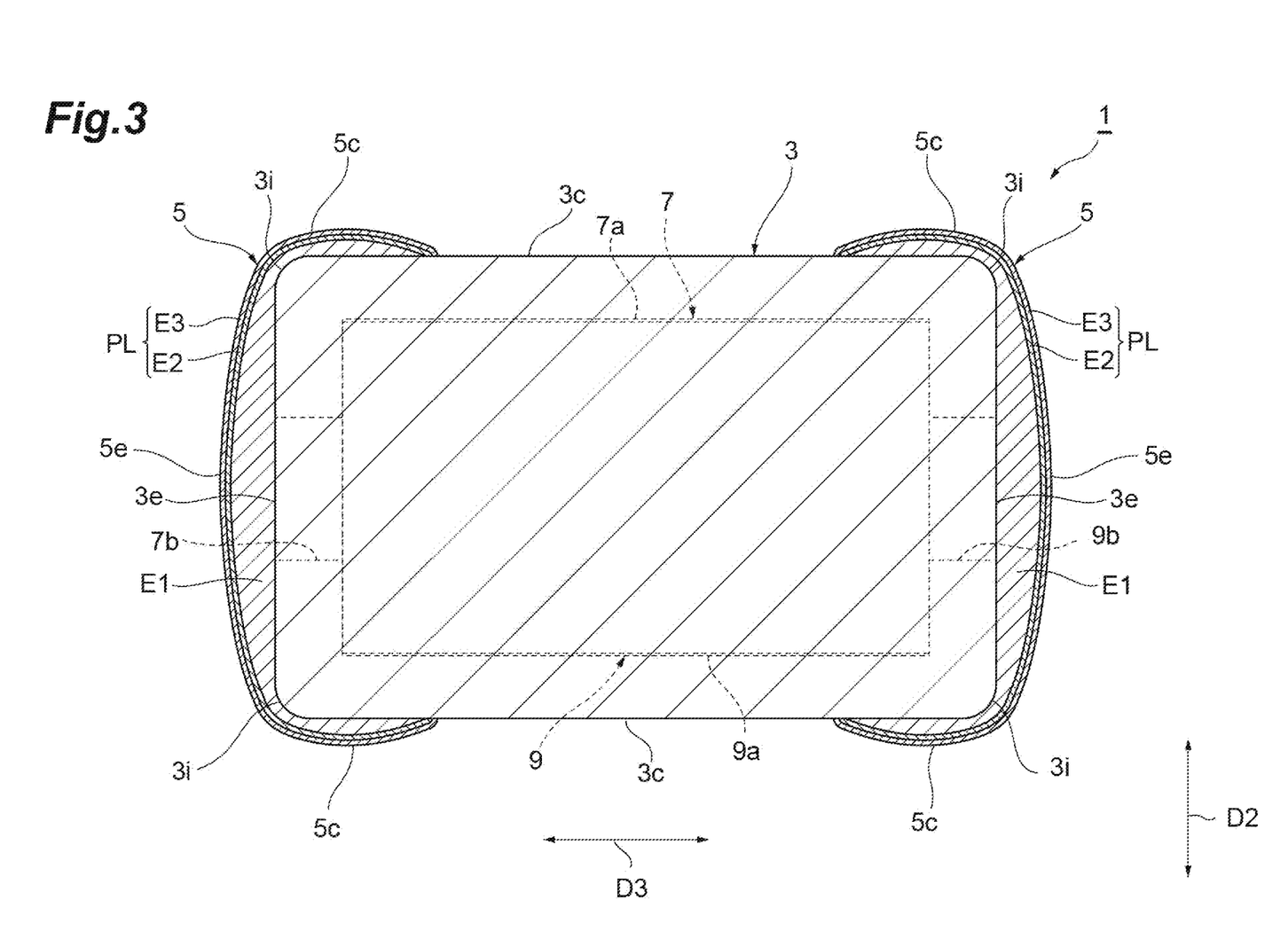
FIG. 3 is a view illustrating a cross-sectional configuration of the multilayer capacitor according to the present embodiment.

As illustrated in FIGS. 2 and 3, the multilayer capacitor 1 includes a plurality of internal electrodes 7 and a plurality of internal electrodes 9. In the present embodiment, the multilayer capacitor 1 includes four internal electrodes 7 and four internal electrodes 9. Each of the internal electrodes 7 and 9 is an internal conductor disposed in the element body 3. Each of the internal electrodes 7 and 9 is made of a conductive material normally used for internal electrodes of lamination-type electronic components. The conductive material may include, for example, a base metal. The conductive material may include, for example, Ni or Cu. The internal electrodes 7 and 9 are formed as a sintered body of a conductive paste containing the above-described conductive material.

The internal electrodes 7 and the internal electrodes 9 are disposed at different positions (layers) in the first direction D1. In the element body 3, the internal electrodes 7 and the internal electrodes 9 are alternately disposed to face each other with a distance therebetween in the first direction D1. The internal electrode 7 and the internal electrode 9 have different polarities from each other.

The plurality of internal electrodes 7 and the plurality of internal electrodes 9 are alternately aligned in the first direction D1. The internal electrodes 7 and 9 are each positioned in a plane that is substantially parallel to the main surfaces 3a. The internal electrodes 7 and the internal electrodes 9 face each other in the first direction D1. A direction in which the internal electrodes 7 and the internal electrodes 9 face each other (the first direction D1) is perpendicular to a direction parallel to the main surfaces 3a (the second direction D2 and the third direction D3). In the present embodiment, a distance between the internal electrode 7 closest to one main surface 3a and the internal electrode 9 closest to the other main surface 3a may be, for example, 1500 µm.

Figure 5:
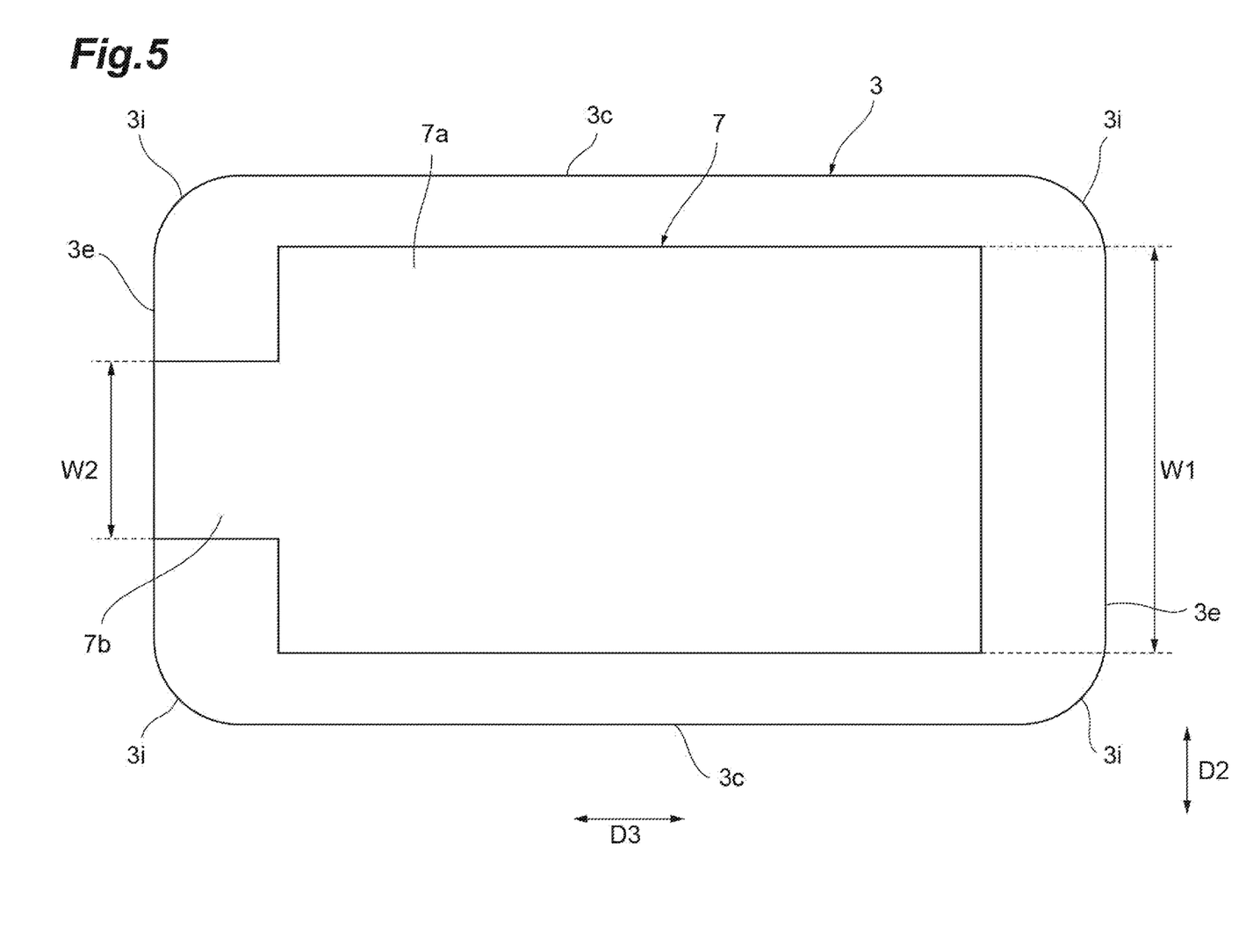
FIG. 5 is a view illustrating a configuration of an internal electrode.

As illustrated in FIGS. 4 and 5, the internal electrodes 7 each include an electrode portion 7a and a connecting portion 7b. The electrode portion 7a has a rectangular shape. The connecting portion 7b has a rectangular shape. The connecting portion 7b extends from one side of the electrode portion 7a and is exposed to a corresponding one end surface 3e. The connecting portion 7b extends from one side of the electrode portion 7a on one end surface 3e side so that a central portion of the connecting portion 7b in the second direction D2 and a central portion of the electrode portion 7a in the second direction D2 are substantially coincident with each other. The connecting portion 7b of the internal electrode 7 exposed to one end surface 3e is joined to the external electrode 5. The connecting portion 7b connects the electrode portion 7a and the external electrode 5. Thereby, the internal electrode 7 is electrically connected to the external electrode 5.

As illustrated in 5, in the internal electrode 7, a width W1 of the electrode portion 7a in the second direction D2 is larger than a width W2 of the connecting portion 7b. In other words, the width W2 of the connecting portion 7b is smaller than the width W1 of the electrode portion 7a. In the present embodiment, for example, the width W1 of the electrode portion 7a may be 1500 μm, and the width W2 of the connecting portion 7b may be 750 μm. That is, the width W1 of the electrode portion 7a is twice the width W2 of the connecting portion 7b. For example, a length of the electrode portion 7a in the third direction D3 may be 2990 μm, and a length of the connecting portion 7b in the third direction D3 may be 170 μm.

As illustrated in FIG. 4, the internal electrode 9 includes an electrode portion 9a and a connecting portion 9b. The electrode portion 9a has a rectangular shape. The connecting portion 9b has a rectangular shape. The connecting portion 9b extends from one side of the electrode portion 9a and is exposed to the corresponding other end surface 3e. The connecting portion 9b extends from one side of the electrode portion 9a on the other end surface 3e side so that a central portion of the connecting portion 9b in the second direction D2 and a central portion of the electrode portion 9a in the second direction D2 are substantially coincident with each other. The connecting portion 9b of the internal electrode 9 exposed on the other end surface 3e is joined to the external electrode 5. The connecting portion 9b connects the electrode portion 9a and the external electrode 5. Thereby, the internal electrode 9 is electrically connected to the external electrode 5.

In the internal electrode 9, a width W1 of the electrode portion 9a in the second direction D2 is larger than a width W2 of the connecting portion 9b. In other words, the width W2 of the connecting portion 9b is smaller than the width W1 of the electrode portion 9a. In the present embodiment, for example, the width W1 of the electrode portion 9a may be 1500 μm, and the width W2 of the connecting portion 9b may be 750 μm. That is, the width W1 of the electrode portion 9a is twice the width W2 of the connecting portion 9b. For example, a length of the electrode portion 9a in the third direction D3 may be 2990 μm, and a length of the connecting portion 9b in the third direction D3 may be 170 μm.

As illustrated in FIG. 1, the external electrodes 5 are disposed at both end portions of the element body 3 in the third direction D3. The external electrodes 5 are respectively disposed on corresponding end surface 3e sides of the element body 3. The external electrodes 5 are each disposed on the pair of main surfaces 3a, the pair of side surfaces 3c, and one end surface 3e. The external electrode 5 includes a plurality of electrode portions 5a, 5c, and 5e as illustrated in FIGS. 2 and 3. The electrode portion 5a is disposed on the main surface 3a and the edge line surface 3g. The electrode portion 5c is disposed on the side surface 3c and the edge line surface 3i. The electrode portion 5e is disposed on the end surface 3e. The external electrode 5 also includes an electrode portion disposed on the edge line surface 3j.

The external electrode 5 is formed on five surfaces of the pair of main surfaces 3a, one end surface 3e, and the pair of side surfaces 3c, and on the edge line surfaces 3g, 3i, and 3j. The electrode portions 5a, 5c, and 5e adjacent to each other are connected and electrically connected. The electrode portion 5e covers all of one ends of corresponding internal electrodes 7 and 9. The electrode portion 5e is directly connected to the corresponding internal electrodes 7 and 9. The external electrode 5 is electrically connected to the corresponding internal electrodes 7 and 9. The external electrode 5 includes a first electrode layer E1, a second electrode layer E2, and a third electrode layer E1 The third electrode layer E3 constitutes an outermost layer of the external electrode 5, The electrode portions 5a, 5c, and 5e each have the first electrode layer E1, the second electrode layer E2, and the third electrode layer E3.

The first electrode layer E1 is disposed on a part of the main surface 3a, a part of the side surface 3c, and the end surface 3e. A part of the main surface 3a and a part of the side surface 3c may be, for example, parts of the main surface 3a and the side surface 3c that are close to the end surface 3e. The first electrode layer E1 is formed to cover the edge line surfaces 3g, 3i, and 3j. The first electrode layer E1 is formed to cover the entire edge line surface 3g and edge line surface 3l. The first electrode layer E1 is in contact with the entire edge line surface 3g and edge line surface 3i.

The first electrode layer E1 is formed by baking a conductive paste applied to a surface of the element body 3. The first electrode layer E1 is formed when a metal component (metal powder) contained in the conductive paste is sintered. The first electrode layer E1 is a sintered metal layer (electrode layer). The first electrode layer E1 is a sintered metal layer formed on the element body 3. In the present embodiment, the first electrode layer E1 is a sintered metal layer made of Cu. The first electrode layer E1 may also be a sintered metal layer made of Ni. The first electrode layer E1 contains a base metal. The conductive paste may contain, for example, a powder made of Cu or Ni, a glass component, an organic binder, and an organic solvent. Each first electrode layer E1 included in the electrode portions 5a, 5c, and 5e are integrally formed.

The second electrode layer E2 is disposed on the first electrode layer E1. The second electrode layer E2 covers the entire first electrode layer E1. The second electrode layer E2 is in contact with the entire first electrode layer E1. The second electrode layer E2 is in contact with a part of the main surface 3a and a part of the side surface 3c. The second electrode layer E2 is formed on the first electrode layer E1 using a plating method. In the present embodiment, the second electrode layer E2 is formed on the first electrode layer E1 by Ni plating. The second electrode layer E2 is a Ni-plated layer. The second electrode layer E2 may also be a Sn-plated layer, a Cu-plated layer, or an Au-plated layer. The second electrode layer E2 contains Ni, Sn, Cu, or Au. The Ni-plated layer is superior in solder corrosion resistance to the metal contained in the first electrode layer E1.

The third electrode layer E3 is disposed on the second electrode layer E2. The third electrode layer E3 covers the entire second electrode layer E2. The third electrode layer E3 is in contact with the entire second electrode layer E2. The third electrode layer E3 is in contact with a part of the main surface 3a and a part of the side surface 3c. The third electrode layer E3 is formed on the second electrode layer E2 using a plating method. The third electrode layer E3 is a solder-plated layer. In the present embodiment, the third electrode layer E3 is formed on the second electrode layer E2 by Sn plating. The third electrode layer E3 is a Sn-plated layer. The third electrode layer E3 may also be a Sn—Ag alloy plated layer, a Sn—Bi alloy plated layer, or a Sn—Cu alloy plated layer. The third electrode layer E3 contains Sn, a Sn—Ag alloy, a Sn—Bi alloy, or a Sn—Cu alloy.

The second electrode layer E2 and the third electrode layer E3 form a plated layer PL In the present embodiment, the plated layer PL has a two-layer structure. The plated layer PL covers the first electrode layer E1. Each second electrode layer E2 included in the electrode portions 5a, 5c, and 5e are integrally formed. Each third electrode layer E3 included in the electrode portions 5a, 5c, and 5e are integrally formed.

Figure 6A:
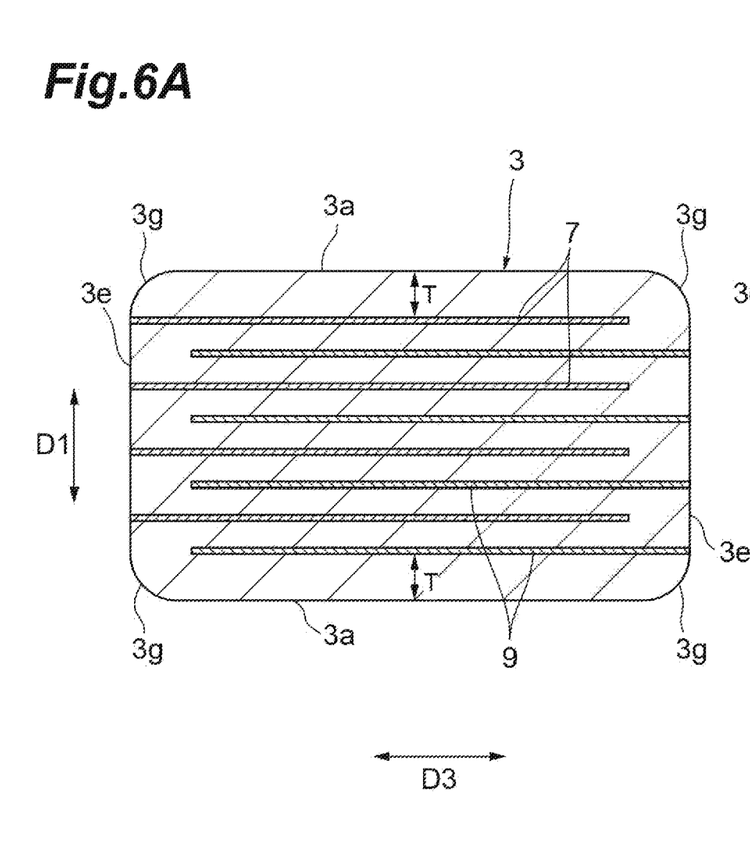
FIG. 6A is a view illustrating a cross-sectional configuration of the element body.
Figure 6B:
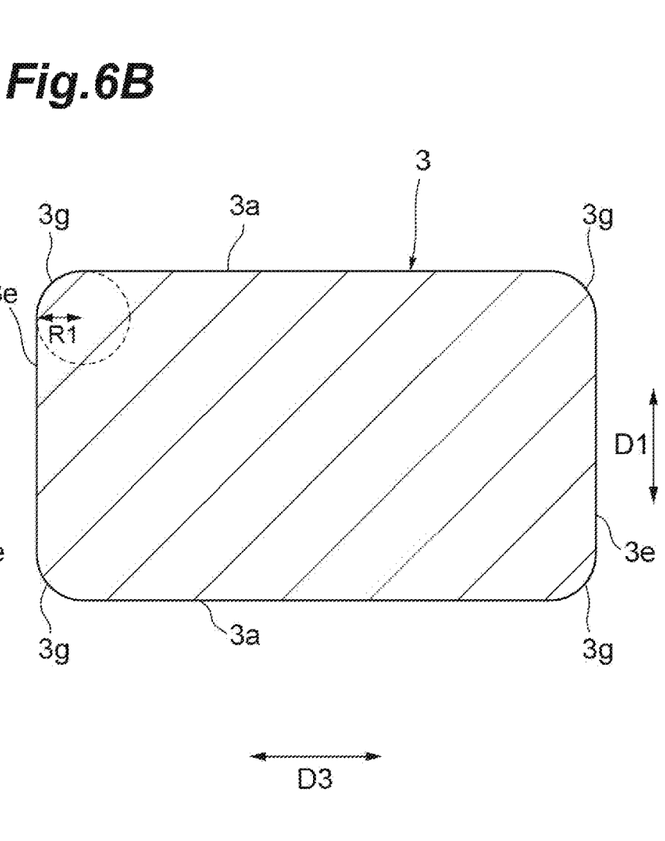
FIG. 6B is a view illustrating a cross-sectional configuration of the element body.

As illustrated in FIG. 6A and FIG. 6B, when a radius of curvature of the edge line surface 3g is R1 (μm) and a thickness between the main surface 3a and the internal electrode 7 or 9 at a position at which the main surface 3a and the internal electrode 7 or 9 are closest to each other in the lamination direction is T (µm), a relationship of $$R1<T$$

is satisfied in a first cross section (cross section extending in the first direction D1 and the third direction D3 and viewed from the second direction D2) extending in the direction in which the pair of end surfaces 3e face each other (the third direction D3), extending in the lamination direction of the plurality of internal electrodes 7 and 9 (the first direction D1), and including the electrode portions 7a and 9a and the connecting portions 7b and 9b. That is, the radius of curvature R1 is smaller than the thickness T. The first cross section is a cross section within a range of the width W2 of the connecting portions 7b and 9b exposed to the end surface 3e in the second direction D2 of the element body 3. That is, the first cross section is a cross section including end portions of the connecting portions 7b and 9b in the third direction D3. In the present embodiment, the radius of curvature R1 may be, for example, 150 µm. The thickness T may be, for example, 190 µm. In FIG. 6B, illustration of the internal electrodes 7 and 9 are omitted.

Figure 7A:
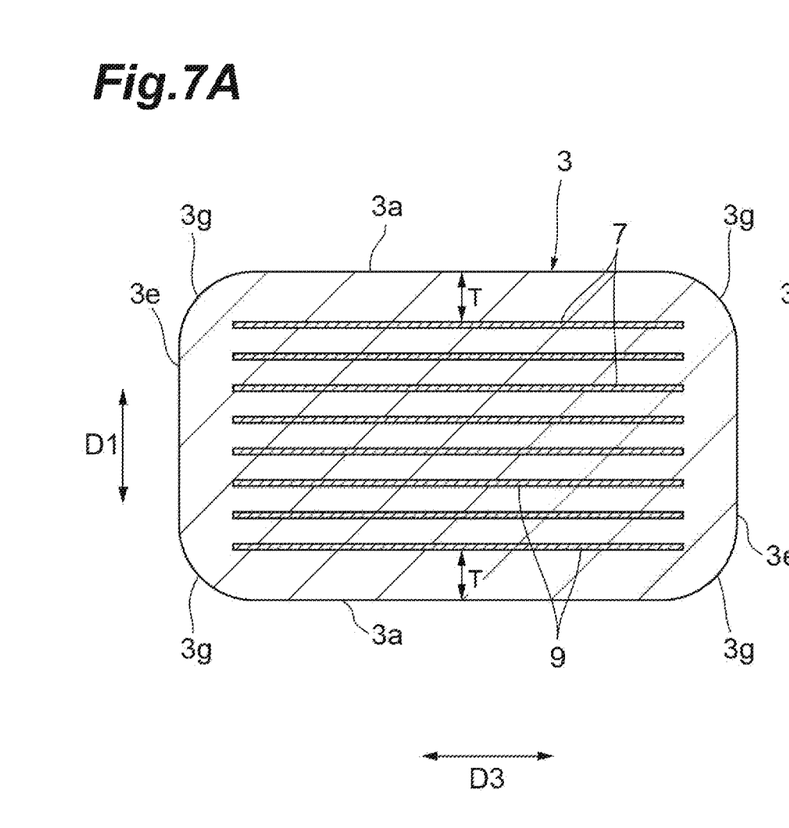
FIG. 7A is a view illustrating a cross-sectional configuration of the element body.
Figure 7B:
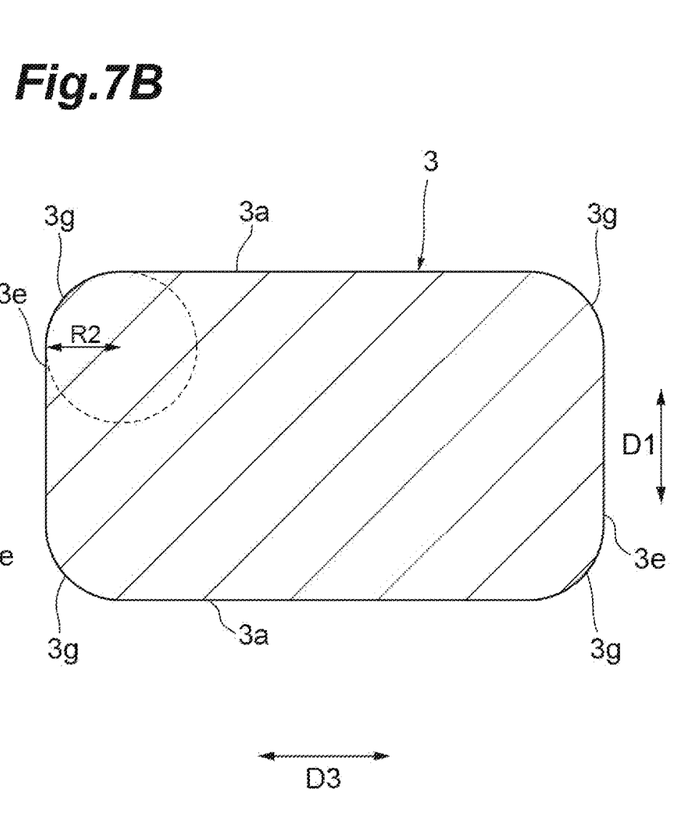
FIG. 7B is a view illustrating a cross-sectional configuration of the element body.

As illustrated in FIG. 7A and FIG. 7B, when a radius of curvature of the edge line surface 3g is R2 (µm) and a thickness between the main surface 3a and the internal electrode 7 or 9 at a position at which the main surface 3a and the internal electrode 7 or 9 are closest to each other in the lamination direction is (µm), a relationship of $$R2>T$$

is satisfied in a second cross section extending in the direction in which the pair of end surfaces 3e face each other (the third direction D3), extending in the lamination direction of the plurality of internal electrodes 7 and 9 (the first direction D1), and including the electrode portions 7a and 9a. That is, the radius of curvature R2 is larger than the thickness T. The second cross section is a cross section in which the connecting portions 7b and 9b are not included, and is a cross section within a range between the connecting portion 7b or 9b and the side surface 3c in the second direction D2 of the element body 3. Specifically, the second cross section is a cross section within a range between the connecting portion 7b or 9b and an end portion in the second direction D2 of the electrode portion 7a or 9a in the second direction D2 of the element body 3. In the present embodiment, the radius of curvature R2 may be, for example, 200 µm. In FIG. 7B, illustration of the internal electrodes 7 and 9 are omitted.

Figure 8:
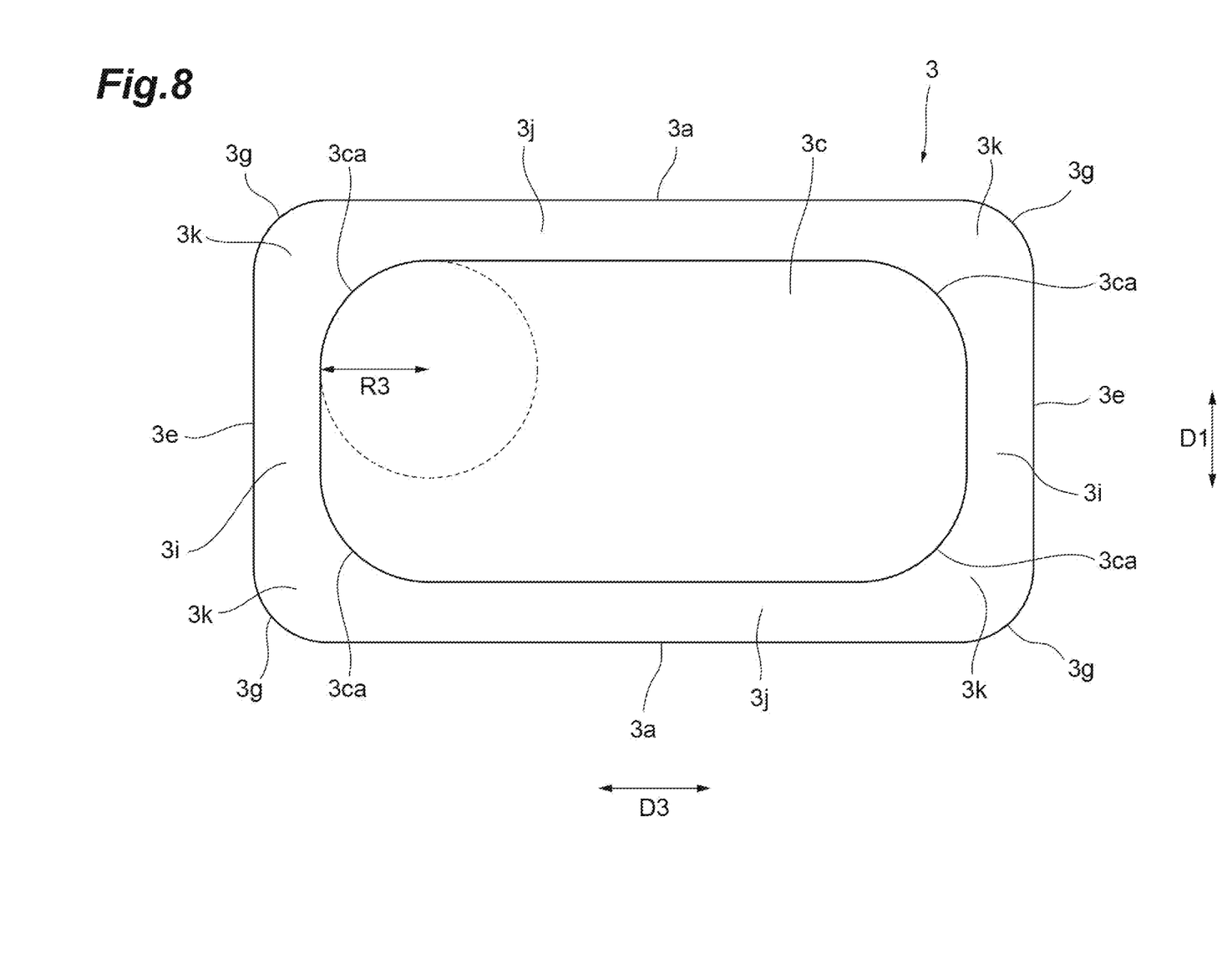
FIG. 8 is a view illustrating a side surface of the element body.

As illustrated in FIG. 8, the side surface 3c of the element body 3 has a rectangular shape in which each corner portion 3ca is chamfered. A radius of curvature R3 of the corner portion 3ca of the side surface 3c of the element body 3 is larger than the radius of curvature R1 of the edge line surface 3g (R3>R1). In other words, the radius of curvature R1 of the edge line surface 3g is smaller than the radius of curvature R3 of the corner portion 3k of the element body 3 (R2<R3). The radius of curvature R1 may be, for example, 220 µm. The element body 3 satisfies a relationship of R1<R2<R3.

Figure 9:
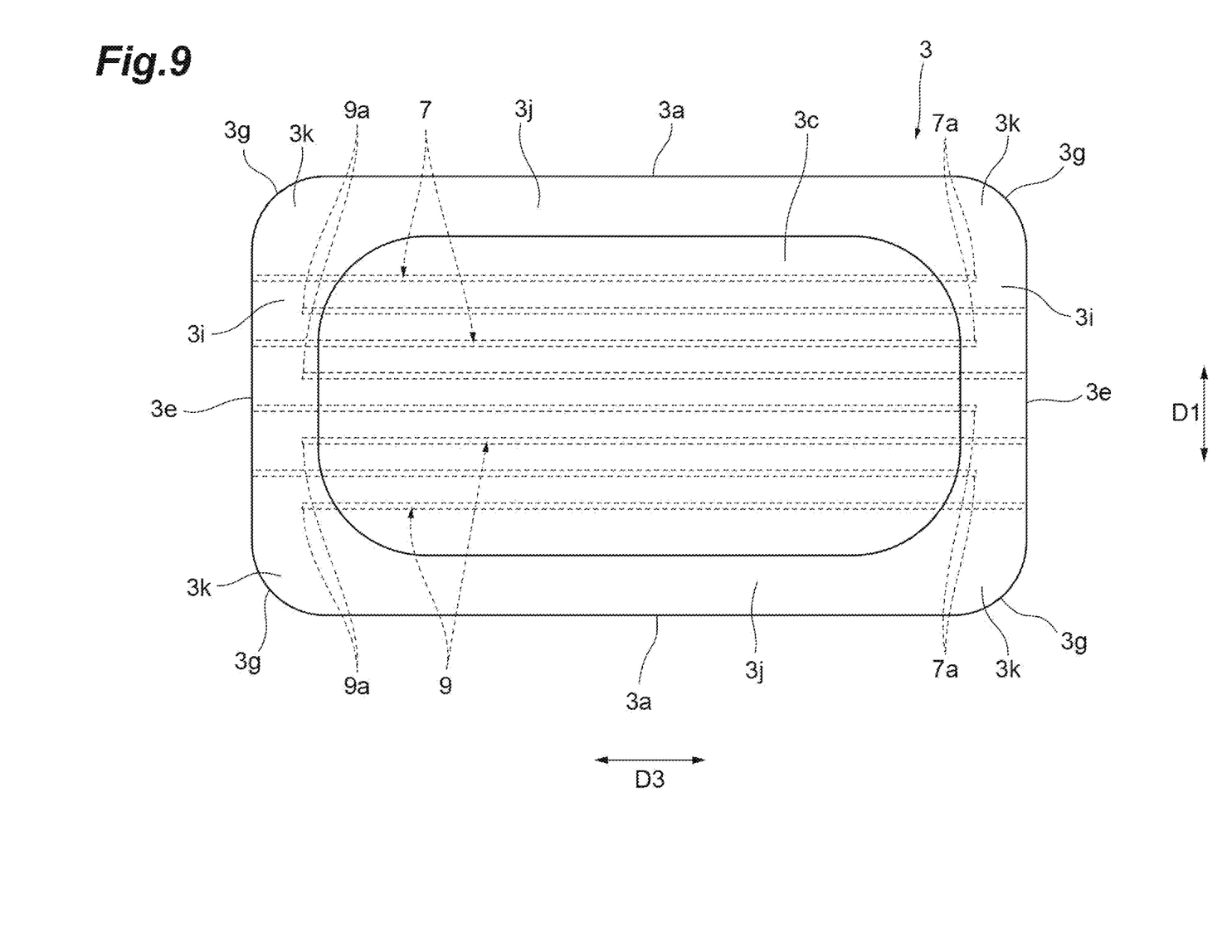
FIG. 9 is a view illustrating a side surface of the element body.

As illustrated in FIG. 9, when viewed from a direction (the second direction D2) perpendicular to the side surface 3c which is parallel to the lamination direction (the first direction D1) of the plurality of internal electrodes 7 and 9, the electrode portions 7a and 9a in the first cross section and the second cross section have portions positioned in a region corresponding to the edge line surface 3i. Specifically, when viewed from the direction (the second direction D2) perpendicular to the side surface 3c which is parallel to the lamination direction of the plurality of internal electrodes 7 and 9, end portions in the direction (the third direction D3) in which the pair of end surfaces 3e and 3e face each other in the electrode portions 7a and 9a in the first cross section and the second cross section have portions positioned in the region corresponding to the edge line surface 3i, That is, the electrode portions 7a and 9a of the internal electrodes 7 and 9 protrude from the side surface 3c in the third direction D3 when viewed from the second direction D2.

As described above, when the radius of curvature of the edge line surface 3g is R1 and the thickness between the main surface 3a and the internal electrode 7 or 9 at a position at which the main surface 3a and the internal electrode 7 or 9 are closest to each other in the lamination direction is T, the relationship of $$R1<T$$

is satisfied in the multilayer capacitor 1 according to the present embodiment. As described above, in the multilayer capacitor 1, the radius of curvature R1 of the edge line surface 3g of the element body 3 in the first cross section is smaller than the thickness T between the main surface 3a and the internal electrode 7 or 9. That is, in the multilayer capacitor 1, an outer layer thickness of the element body 3 is larger than a curvature of the edge line surface 3g of the element body 3 in the first cross section. Thereby, in the multilayer capacitor 1, entering of a plating solution into the element body 3 via the connecting portions 7b and 9b of the internal electrodes 7 and 9 can be suppressed in a plating process of forming the plated layer PL of the external electrode 5. As a result, improvement in reliability can be achieved in the multilayer capacitor 1.

The multilayer capacitor 1 includes the edge line surface 3g formed on the element body 3. In this configuration, when the first electrode layer E1 is formed, a thickness of the first electrode layer E1 formed on the edge line surface 3g can be smaller than a thickness of the first electrode layer E1 formed on the end surface 3e. Therefore, in the plating process of forming the plated layer PL of the external electrode 5, entering of the plating solution is more likely to occur in the first electrode layer E1 disposed on the edge line surface 3g of the element body 3 than in the first electrode layer E1 disposed on the end surface 3e. Therefore, the multilayer capacitor 1 employs a configuration that satisfies the above-described relationship. Thereby, in the multilayer capacitor 1, entering of the plating solution into the element body 3 via the connecting portions 7b and 9b of the internal electrodes 7 and 9 can be suppressed in the plating process of forming the plated layer PL of the external electrode 5.

In the multilayer capacitor 1 according to the present embodiment, when the radius of curvature of the edge line surface 3g is R2, the relationship of $$R2>T$$

is satisfied in the second cross section extending in the direction in which the pair of end surfaces 3e face each other, extending in the lamination direction of the plurality of internal electrodes 7 and 9, and including the electrode portions 7a and 9a. In this configuration, the radius of curvature of the edge line surface 3g can be increased towards the corner portion 3k of the element body 3. Therefore, in the multilayer capacitor 1, the corner portion 3k can have an increasingly curved shape toward the corner portion 3k of the element body 3. Accordingly, occurrence of chipping in the element body 3 can be further suppressed in the multilayer capacitor 1.

In the multilayer capacitor 1 according to the present embodiment, the side surfaces 3c parallel to the lamination direction of the plurality of internal electrodes 7 and 9 has a rectangular shape in which the corner portion 3ca is curved. When the radius of curvature of the corner portion 3ca of the side surface 3c is R3, a relationship of $$R1<R3$$

is satisfied. In this configuration, the radius of curvature of the edge line surface 3g increases towards the corner portion 3k of the element body 3. That is, the corner portion 3k of the element body 3 can be made to have a curved shape in the multilayer capacitor 1. Therefore, occurrence of chipping in the element body 3 can be further suppressed in the multilayer capacitor 1.

In the multilayer capacitor 1 according to the present embodiment, the width W2 of the connecting portions 7b and 9b of the internal electrodes 7 and 9 is smaller than the width W1 of the electrode portions 7a and 9a. In this configuration, a configuration in which the connecting portions 7b and 9b are positioned in a region corresponding to the corner portion 3k and the edge line surface 3i of the element body 3 can be avoided by making the width W2 of the connecting portions 7b and 9b small. Thereby, in the multilayer capacitor 1, entering of the plating solution into the element body 3 via the connecting portions 7b and 9b of the internal electrodes 7 and 9 can be suppressed in the plating process of forming the plated layer PL of the external electrode 5. Therefore, improvement in reliability can be achieved in the multilayer capacitor 1. On the other hand, in the multilayer capacitor 1, areas of the electrode portions 7a and 9a can be increased by making widths of the electrode portions 7a and 9a large. Therefore, increase in capacitance can be achieved in the multilayer capacitor 1.

In the multilayer capacitor 1 according to the present embodiment, the first cross section includes the end portions of the connecting portions 7b and 9b exposed to the end surface 3e. In this configuration, the relationship of R1<T is satisfied in the entire region of the connecting portions 7b and 9b exposed to the end surface 3e. Therefore, in the multilayer capacitor 1, entering of the plating solution into the element body 3 via the connecting portions 7b and 9b of the internal electrodes 7 and 9 can be further suppressed in the plating process of forming the plated layer PL of the external electrode 5.

In the multilayer capacitor 1 according to the present embodiment, when viewed from the direction perpendicular to the side surface 3c which is parallel to the lamination direction of the internal electrodes 7 and 9, the electrode portions 7a and 9a in the first cross section and the second cross section have portions positioned in the region corresponding to the edge line surface 3i. In this configuration, the electrode portions 7a and 9a in the first cross section and the second cross section have portions protruding from the side surface 3c in the direction in which the pair of end surfaces 3e face each other. Thereby, areas of the electrode portions 7a and 9a can be increased in the multilayer capacitor 1. Accordingly, increase in capacitance can be achieved in the multilayer capacitor 1.

While a preferred embodiment of the present invention have been described above, the present invention is not necessarily limited to the above-described embodiment, and various modifications can be made without departing from the gist of the present invention.

In the above-described embodiment, as illustrated in FIG. 5, a configuration in which the width W1 of the electrode portion 7a is larger than the width W2 of the connecting portion 7b in the internal electrode 7 has been described as an example. However, the width W1 of the electrode portion 7a and the width W2 of the connecting portion 7b may be the same as each other in the internal electrode 7. That is, the internal electrode 7 may have a rectangular shape as a whole. The same applies to the internal electrodes 9.

In the above-described embodiment, a configuration in which the end portions in the direction (the third direction D3) in which the pair of end surfaces 3e and 3e face each other in the electrode portions 7a and 9a in the first cross section and the second cross section have portions positioned in the region corresponding to the edge line surface 3i when viewed from the direction (the second direction D2) perpendicular to the side surface 3c which is parallel to the lamination direction of the plurality of internal electrodes 7 and 9 has been described as an example. However, end portions in the direction (the third direction D3) in which the pair of end surfaces 3e and 3e face each other in the electrode portions 7a and 9a in the first cross section and/or the second cross section of at least two internal electrodes 7 and 9 which are disposed at end portions in the lamination direction of the plurality of internal electrodes 7 and 9 may have portions positioned in the region corresponding to the edge line surface 3i.

In the above-described embodiment, a configuration in which the multilayer capacitor 1 includes four internal electrodes 7 and four internal electrodes 9 has been described as an example. However, the number of internal electrodes 7 and 9 may be appropriately set according to a design.

In the above-described embodiment, a configuration in which the electronic component is the multilayer capacitor 1 has been described as an example. However, the electronic component is not limited to a multilayer capacitor. Electronic components to which the present invention can be applied may be, for example, laminated electronic components such as laminated varistors, laminated piezoelectric actuators, laminated thermistors, or laminated composite components, or electronic components other than the laminated electronic components.

In the present specification, when it is described that an element is disposed on another element, the element may be directly disposed on another element or may be indirectly disposed on another element. When an element is indirectly disposed on another element, there is an intervening element between the element and another element. When one element is directly disposed on another element, there is no intervening element between the element and another element, In the present specification, when it is described that an element is positioned on another element, the element may be directly positioned on another element or may be indirectly positioned on another element. When an element is indirectly positioned on another element, there is an intervening element between the element and another element. When one element is directly positioned on another element, there is no intervening element between the element and another element.

In the present specification, when it is described that an element covers another element, the element may directly cover another element or may indirectly cover another element. When an element indirectly covers another element, there is an intervening element between the element and another element. When one element directly covers another element, there is no intervening element between the element and another element,

What is claimed is:

1. An electronic component comprising:
   an element body including a pair of end surfaces facing each other and four side surfaces connecting the pair of end surfaces;
   an external electrode disposed on the side surfaces and each of the end surfaces; and
   a plurality of internal electrodes disposed in the element body, wherein
   the element body includes an edge line surface which is provided between the end surface and each of the side surfaces and which is curved,
   the external electrode includes an electrode layer provided across the end surface and a part of at least one of the side surfaces and a plated layer covering the electrode layer,
   the plurality of internal electrodes each include an electrode portion disposed to face other internal electrodes and a connecting portion connecting the electrode portion and the external electrode,
   a relationship of $$R1<T$$

is satisfied in a first cross section extending in a direction in which the pair of end surfaces face each other, extending in the lamination direction of the plurality of internal electrodes, and including the electrode portion and the connecting portion when a radius of curvature of the edge line surface is R1 and a thickness between one of the side surfaces and the internal electrode at a position at which one of the side surfaces and the internal electrode are closest to each other in a lamination direction is T, and
   a relationship of $$R2>T$$

is satisfied in a second cross section extending in the direction in which the pair of end surfaces face each other, extending in the lamination direction of the plurality of internal electrodes, and including the electrode portions when a radius of curvature of the edge line surface is R2.

2. The electronic component according to claim 1, wherein a width of the connecting portion is smaller than a width of the electrode portion.

3. The electronic component according to claim 2, wherein the first cross section includes an end portion of the connecting portion exposed to the end surface.

4. The electronic component according to claim 1, wherein the electrode portion in the second cross section has a portion positioned in a region corresponding to the edge line surface when viewed from a direction perpendicular to the one of the side surfaces which is parallel to the lamination direction.

5. The electronic component according to claim 4, wherein end portions in a direction in which the pair of end surfaces face each other in the electrode portions in the second cross section of two internal electrodes which are disposed at end portions in the lamination direction of the plurality of internal electrodes have portions positioned in the region corresponding to the edge line surface when viewed from the direction perpendicular to the one of the side surfaces which is parallel to the lamination direction.

6. The electronic component according to claim 1, wherein the electrode portion in the first cross section has a portion positioned in a region corresponding to the edge line surface when viewed from a direction perpendicular to the one of the side surfaces which is parallel to the lamination direction.

7. The electronic component according to claim 6, wherein end portions in a direction in which the pair of end surfaces face each other in the electrode portions in the first cross section of two internal electrodes which are disposed at end portions in the lamination direction of the plurality of internal electrodes have portions positioned in the region corresponding to the edge line surface when viewed from the direction perpendicular to the one of the side surfaces which is parallel to the lamination direction.

8. An electronic component comprising:
   an element body including a pair of end surfaces facing each other and four side surfaces connecting the pair of end surfaces;
   an external electrode disposed on the side surfaces and each of the end surfaces; and
   a plurality of internal electrodes disposed in the element body, wherein
   the element body includes an edge line surface which is provided between the end surface and each of the side surfaces and which is curved,
   the external electrode includes an electrode layer provided across the end surface and a part of at least one of the side surfaces and a plated layer covering the electrode layer,
   the plurality of internal electrodes each include an electrode portion disposed to face other internal electrodes and a connecting portion connecting the electrode portion and the external electrode,
   a relationship of $$R1<T$$

is satisfied in a first cross section extending in a direction in which the pair of end surfaces face each other, extending in the lamination direction of the plurality of internal electrodes, and including the electrode portion and the connecting portion when a radius of curvature of the edge line surface is R1 and a thickness between one of the side surfaces and the internal electrode at a position at which the one of the side surfaces and the internal electrode are closest to each other in a lamination direction is T,
   one of the side surfaces parallel to the lamination direction has a rectangular shape in which a corner portion is curved, and
   a relationship of $$R1<R3$$

is satisfied when a radius of curvature of the corner portion of the one of the side surfaces is R3.

9. The electronic component according to claim 1, wherein a relationship of $$R2>T$$

is satisfied in a second cross section extending in the direction in which the pair of end surfaces face each other, extending in the lamination direction of the plurality of internal electrodes, and including the electrode portions when a radius of curvature of the edge line surface is R2.

10. The electronic component according to claim 9, wherein the electrode portion in the second cross section has a portion positioned in a region corresponding to the edge line surface when viewed from a direction perpendicular to the one of the side surfaces which is parallel to the lamination direction.

11. The electronic component according to claim 10, wherein end portions in a direction in which the pair of end surfaces face each other in the electrode portions in the second cross section of two internal electrodes which are disposed at end portions in the lamination direction of the plurality of internal electrodes have portions positioned in the region corresponding to the edge line surface when viewed from the direction perpendicular to the one of the side surfaces which is parallel to the lamination direction.

12. The electronic component according to claim 8, wherein a width of the connecting portion is smaller than a width of the electrode portion.

13. The electronic component according to claim 12, wherein the first cross section includes an end portion of the connecting portion exposed to the end surface.

14. The electronic component according to claim 8, wherein the electrode portion in the first cross section has a portion positioned in a region corresponding to the edge line surface when viewed from a direction perpendicular to the one of the side surfaces which is parallel to the lamination direction.

15. The electronic component according to claim 14, wherein end portions in a direction in which the pair of end surfaces face each other in the electrode portions in the first cross section of two internal electrodes which are disposed at end portions in the lamination direction of the plurality of internal electrodes have portions positioned in the region corresponding to the edge line surface when viewed from the direction perpendicular to the one of the side surfaces which is parallel to the lamination direction.

* * * * *